(12) United States Patent
Bono et al.

(10) Patent No.: US 10,970,257 B2
(45) Date of Patent: Apr. 6, 2021

(54) REPLICATING FILE SYSTEMS VIA CLOUD STORAGE

(71) Applicant: EMC IP Holding Company LLC, Hopkinton, MA (US)

(72) Inventors: Jean-Pierre Bono, Westborough, MA (US); Sudhir Srinivasan, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 282 days.

(21) Appl. No.: 16/263,031

(22) Filed: Jan. 31, 2019

(65) Prior Publication Data
US 2020/0250149 A1   Aug. 6, 2020

(51) Int. Cl.
G06F 16/182 (2019.01)
G06F 16/11 (2019.01)
H04L 29/08 (2006.01)

(52) U.S. Cl.
CPC ........ *G06F 16/1844* (2019.01); *G06F 16/122* (2019.01); *G06F 16/128* (2019.01); *H04L 67/1097* (2013.01)

(58) Field of Classification Search
CPC .. G06F 16/1844; G06F 16/122; G06F 16/128; H04L 67/1097; H04L 67/1095
See application file for complete search history.

(56) References Cited

U.S. PATENT DOCUMENTS

| | | | |
|---|---|---|---|
| 7,099,957 B2 | 8/2006 | Cheline et al. | |
| 7,213,124 B2 | 5/2007 | Serizawa et al. | |
| 7,383,463 B2 | 6/2008 | Hayden et al. | |
| 7,562,216 B2 | 7/2009 | Borthakur et al. | |
| 7,631,155 B1 | 12/2009 | Bono et al. | |
| 7,739,312 B2 | 6/2010 | Gordon et al. | |
| 7,769,722 B1 | 8/2010 | Bergant et al. | |
| 7,873,700 B2 | 1/2011 | Pawlowski et al. | |
| 8,301,798 B2 | 10/2012 | Mond et al. | |
| 8,554,808 B2 | 10/2013 | Fukatani et al. | |
| 8,892,631 B2 | 11/2014 | Brown et al. | |
| 8,996,837 B1 | 3/2015 | Bono et al. | |
| 9,026,499 B1 * | 5/2015 | Rajimwale | G06F 16/972 707/674 |
| 9,280,555 B1 | 3/2016 | Bono et al. | |

(Continued)

OTHER PUBLICATIONS

"Configuring NFS on VNX™," EMC® VNX™ Series, Release 7.1, EMC Corporation, 1998, 150 pages.

(Continued)

*Primary Examiner* — Etienne P Leroux
(74) *Attorney, Agent, or Firm* — BainwoodHuang (57) ABSTRACT

A technique for replicating file systems to any number of targets includes obtaining a writeable snapshot of a file system on a source, performing cloud tiering of files in the snapshot, replacing the file contents of the snapshot with stubs pointing to the cloud, and generating a namespace backup of the snapshot that includes directories and stubs. The source system ships the namespace backup to the cloud, allowing any authorized target system to restore from the namespace backup to a local file-system replica, such that contents of the cloud-tiered files are made accessible on the target system from the restored namespace via the stubs.

20 Claims, 6 Drawing Sheets

(56) References Cited

U.S. PATENT DOCUMENTS

| | | |
|---|---|---|
| 9,304,999 B1 | 4/2016 | Bono et al. |
| 9,305,009 B1 | 4/2016 | Bono et al. |
| 9,378,219 B1 | 6/2016 | Bono et al. |
| 9,424,117 B1 | 8/2016 | Bono et al. |
| 9,497,103 B2 | 11/2016 | Williams et al. |
| 9,507,787 B1 | 11/2016 | Bono et al. |
| 9,535,630 B1 | 1/2017 | Bono et al. |
| 2010/0174811 A1 | 7/2010 | Musiri |
| 2010/0241731 A1 | 9/2010 | Du et al. |
| 2017/0357551 A1* | 12/2017 | Zacks ............... G06F 11/1448 |
| 2020/0285620 A1* | 9/2020 | Patterson ............ G06F 16/214 |

OTHER PUBLICATIONS

Bono, et al., "Providing Virtual Storage Processor (VSP) Mobility With Induced File System Format Migration," U.S. Appl. No. 14/041,097, filed Sep. 30, 2013.

Bono, et al., "Unified Datapath Processing With Virtualized Storage Processors," U.S. Appl. No. 13/828,294, filed Mar. 14, 2013.

Dell EMC Cloudarray: Cloud-Intergrated Storage; 3 pages.

Dell EMC Unity: Cloud Tiering Appliance (CTA)A Detailed Review; Nov. 2017; 29 pages.

EMC VNX Replication Technologies; Nov. 2015; 34 pages.

EMC VNX Snapshots; Dec. 2013; 57 pages.

EMC® Cloud Tiering Appliance and Cloud Tiering Appliance/VE; Version 12.0 Getting Started Guide; Jul. 2017; 141 pages.

EMC® VNX™ Series Release 7.0 Configuring Virtual Data Movers on VNX™; Feb. 2011; 80 Pages.

Herbert Potzl, Marc E. Fluczynski; "Linux-VServer"; "Proceedings of the Linux Symposium" Volume Two; Jun. 27-30, 2007; pp. 151-160.

Using EMC®Celerra Replicator™ (V2); Feb. 2009; 184 pages.

VMAX3 and VMAX All Flash With Cloudarray Hypermax OS Integration with CloudArray; Sep. 2016; 11 pages.

Bono, Jean-Pierre; "Archiving NAS Servers to the Cloud," U.S. Appl. No. 15/884,687, filed Jan. 31, 2018.

Bono, Jean-Pierre; "Managing Data Using Network Attached Storage (NAS) Cluster," U.S. Appl. No. 15/664,366, filed Jul. 31, 2017.

\* cited by examiner

REPLICATING FILE SYSTEMS VIA CLOUD STORAGE

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts") or host applications, which specify blocks, files, and/or other data elements to be written, read, created, deleted, and so forth. Software running on the storage processors manages incoming storage requests and performs various data processing tasks to organize and secure the data elements on the non-volatile storage devices.

Data storage systems commonly perform replication to establish multiple copies of file systems, which may be useful for backup, failover, load balancing, and disaster recovery. Storage systems may perform replication locally or over arbitrary distances. A typical replication session requires close coordination between a source data storage system and a target data storage system, where the source hosts the file system to be replicated and the target maintains a replica. The source and target work cooperatively to transfer data and keep the replica approximately current with the file system at the source.

SUMMARY

Unfortunately, replication schemes may impose requirements that some target systems are unable to meet. This may occur, for example, when source and target systems are from different manufacturers or use different technologies. Given that replication sessions require close coordination between a source and a target, incompatibilities between source and target can render replication inoperable. Although it is possible to work around such incompatibilities, e.g., by using a third system, such as a host as an intermediary, workarounds can impose burdens on the third system, as well as on administrators. They also do not scale effectively in the presence of multiple targets, as they can impose multiple reads on the source (one for each target) and can thus quickly overburden the system at the source.

In contrast with prior approaches, an improved technique for replicating file systems to any number of targets includes obtaining a writeable snapshot of a file system on a source, performing cloud tiering of files in the snapshot, replacing the file contents of the snapshot with stubs pointing to the cloud, and generating a namespace backup of the snapshot that includes directories and stubs. The source system ships the namespace backup to the cloud, allowing any authorized target system to restore from the namespace backup to a local file-system replica, such that contents of the cloud-tiered files are made accessible on the target system from the restored namespace via the stubs.

Advantageously, the improved technique works across a diverse range of platforms and technologies, enabling otherwise incompatible systems to participate in file-system replication. Although the technique imposes stubs on the snapshot when cloud-tiering the files, the source file system itself is unaffected, thereby preserving performance at the source.

In some examples, the technique works with an arbitrary number of target systems and scales effectively, as the burden imposed on the source system is substantially the same regardless of whether there is one target system or a thousand. The improved technique can thus be used as a vehicle for distributing or broadcasting content to an arbitrary number of target systems.

In some examples, the improved technique performs updates of contents in the cloud to reflect changes in the source file system as it evolves. According to some variants, the source system tiers new and modified files in the source file system to the cloud and maintains a log of namespace transactions to the source file system. According to further variants, the source system ships the namespace log to the cloud, where subscribing target systems can access the log and replay it against their respective replicas, thereby keeping the content of the replicas consistent with that of the source file system.

Certain embodiments are directed to a method of replicating file systems using cloud storage. The method includes generating a writeable snapshot of a source file system hosted on a source data storage system, the writeable snapshot providing a point-in-time version of the source file system. For each of a set of files in the writeable snapshot, the method further includes performing a cloud-tiering operation by (i) copying data of the respective file to a respective object in cloud storage and (ii) replacing the copied data of the file with a stub that points to the copied data in the respective object in the cloud storage. The method still further includes performing a namespace backup of the writeable snapshot to an identified object in the cloud storage, the namespace backup including a directory structure and stubs of the writeable snapshot but excluding the data of the set of files, the namespace backup enabling a target data storage system to construct a replica of the source file system by performing a namespace restore from the identified object in the cloud storage.

Other embodiments are directed to a data storage system constructed and arranged to perform a method of replicating file systems using cloud storage, such as the method described above. Still other embodiments are directed to a computer program product. The computer program product stores instructions which, when executed on control circuitry of a data storage system, cause the data storage system to perform a method of replicating file systems using cloud storage, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. One should appreciate that such embodiments are provided by way of example to illustrate certain features and principles of the invention but that the invention hereof is not limited to the particular embodiments described.

An improved technique for replicating file systems to any number of targets includes obtaining a writeable snapshot of a file system on a source, performing cloud tiering of files in the snapshot, replacing the file contents of the snapshot with stubs pointing to the cloud, and generating a namespace backup of the snapshot that includes directories and stubs. The source system ships the namespace backup to the cloud, allowing any authorized target system to restore from the namespace backup to a local file-system replica, such that contents of the cloud-tiered files are made accessible on the target system from the restored namespace via the stubs.

Figure 1:
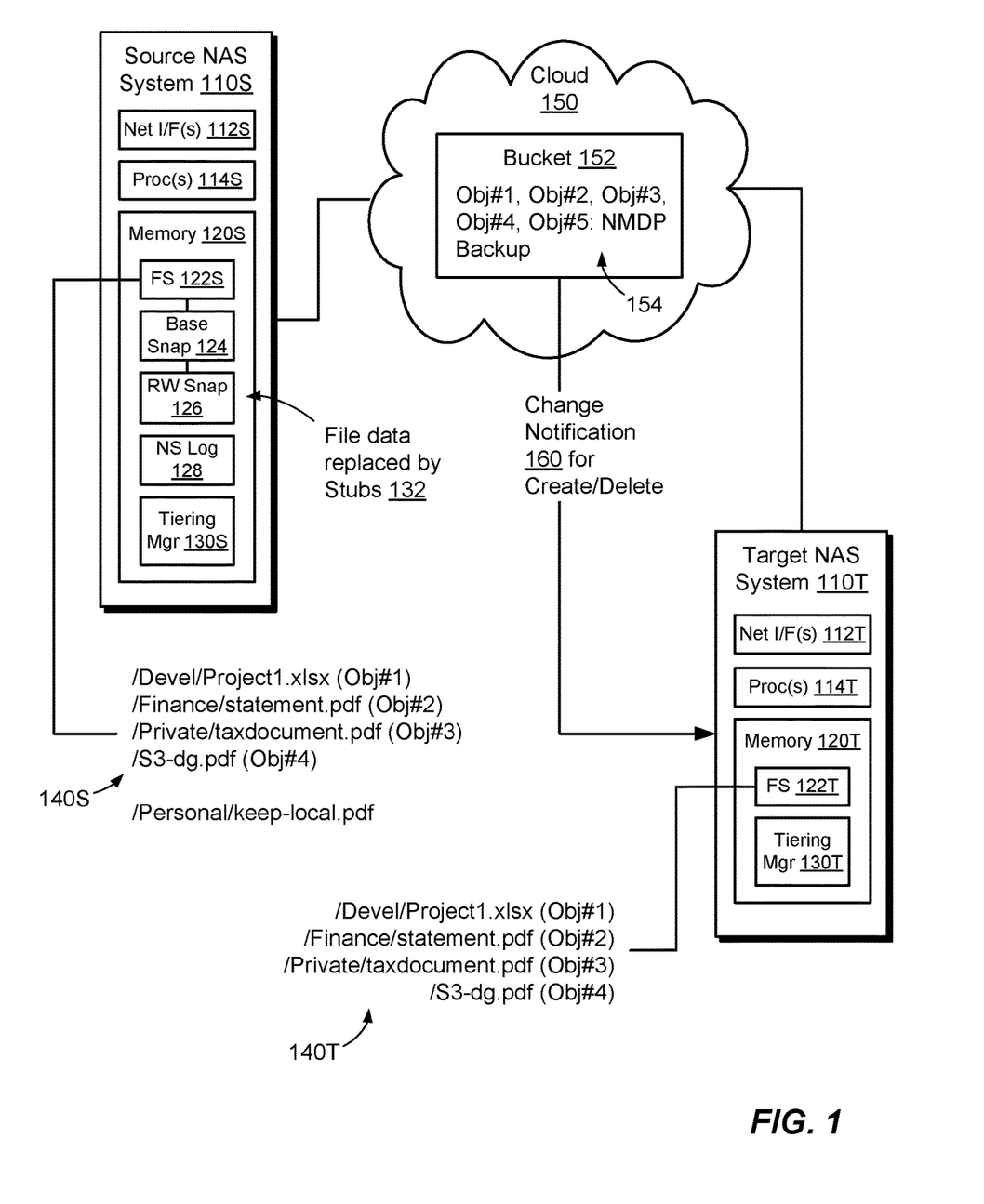
FIG. 1 is a block diagram of an example environment in which embodiments of the improved technique can be practiced. Particularly shown is an example baseline replication of a file system from a source to a target.

FIG. 1 shows an example environment 100 in which embodiments of the improved technique can be practiced. Here, a source NAS (Network Attached Storage) system 110S stores a source file system 122S and engages in replication with a target NAS system 110T, which is configured to create and maintain a target file system 122T as a replica of the source file system 122S. The source NAS system 110S and the target NAS system 110T each have a network connection (e.g., over the Internet or some other computer network) to a cloud storage service, or simply "cloud," 150, such as Amazon S3, Microsoft Azure, Google Cloud, Dell EMC Elastic Cloud Storage, or any other cloud storage service, which may include public cloud and/or private cloud services.

The NAS systems 110S and 110T are data storage systems or clusters that each include one or more computing nodes coupled to persistent storage. The source NAS system 110S, which is shown in simplified form, includes one or more network interfaces 112S, a set of processors 114S, and memory 120S. The memory 120S includes both volatile memory, e.g., Random Access Memory (RAM), and non-volatile memory, such as one or more ROMs (Read-Only Memories), disk drives, solid state drives, and the like. The set of processors 114S and the memory 120S together form control circuitry, which is constructed and arranged to carry out various methods and functions as described herein. Also, the memory 120S includes a variety of software constructs realized in the form of executable instructions. When the executable instructions are run by the set of processors 114S, the set of processors 114S is made to carry out the operations of the software constructs. The target NAS system 110T is configured in a similar fashion, with network interface(s) 112T, processors 114T, and memory 120T arranged in a similar manner to the corresponding components of the source NAS system 110S. The source NAS system 110S and the target NAS system 110T need not be of the same make or model, however. For instance, they may be made by different manufacturers and may have different designs. Each NAS system may have its own respective legacy replication solution, and the replication solutions across the two NAS systems need not be compatible with each other. However, each NAS system 110S or 110T is capable of storing a respective file system and communicating with the cloud 150.

The source and target NAS systems 110S and 110T each include a respective tiering manager, 130S or 130T. Each tiering manager is configured to perform cloud tiering of files by copying local contents of each file to a respective object in the cloud 150 and replacing the local contents of each file with a stub. As is known, a "stub" is a small data structure, such as 8 kB in size, which resides within a file system and points to file content that is stored elsewhere. When a file system receives a request to access a stubbed file, the file system reads file metadata within its local address space, follows the metadata to a stub, and retrieves the file content from the location pointed to by the stub, which may be in the cloud. The tiering managers 130S and 130T may also include a component, such as a driver, to retrieve contents of stubbed files from the cloud 150 in response to read requests. Non-limiting examples of suitable tiering managers 130S and 130T include Dell EMC's Cloud Tiering Appliance (CTA) and Dell EMC's Glider.

In an example, the cloud storage service 150 is configured to store objects 154 and may organize the objects 154 in buckets, such as bucket 152. Each object 154 in the cloud 150 is uniquely identifiable. In some cases, identifying an object 154 requires specifying both a bucket and an object identifier; however, any identification scheme may be used. In some examples, the objects 154 support assignments of attributes, and such attributes may provide additional identifying information and/or descriptive information about the objects 154 or their contents.

In example operation, an administrator configures replication of the source file system 122S on the source NAS system 110S with a target file system 112T on the target NAS system 110T. Replication is configured using the cloud 150 as an intermediary. For example, the cloud 150 acts as a repository for file content and namespace information about the source file system 122S, and the target NAS system 110T (or any number of target systems) can download the namespace information from the cloud 150 to create a local replica of the source file system 122S. The namespace information includes a directory structure of the source file system 122S (e.g., directories and file names), as well as stubs that point to content of respective files, which reside within respective objects 154 in the cloud 150.

In accordance with improvements hereof, the source NAS system 110S initiates replication of the source file system 122S by generating a base snapshot 124. The base snapshot 124 provides a point-in-time version of the file system 122S as of the time the snapshot 124 is taken. The NAS system 110S then generates a writeable (RW) snapshot 126 of the base snapshot 124. The contents of writeable snapshot 126 are initially identical to the content of base snapshot 124, which are therefore identical to that of the source file system 122S when the base snapshot 124 was taken. NAS system 110S also initializes a namespace (NS) log 128. The namespace log 128 is configured to store descriptions of namespace changes performed on file system 122S after the base snapshot 124 is taken. Transactions within the namespace log 128 are time-ordered and capture actions performed on the file system 122S, such as creations, deletions, renames, hard links, and the like. In some examples, the namespace log 128 is stored within the file system 122S itself, e.g., as a file (which may be hidden) or as some other data structure. Alternatively, the namespace log 128 is separately maintained.

Having generated the writeable snapshot 126, the source NAS system 110S directs the tiering manager 130S to perform a cloud-tiering operation by copying data of a set of files 140S in the writeable snapshot 126 to respective objects 154 in the cloud 150 and by replacing the copied file data with respective stubs 132, e.g., one stub for each copied file. The set of files on which the cloud-tiering operation is performed may include all files in the writeable snapshot 126 or any subset of the files. For example, certain files and/or directories may be excluded from the cloud-tiering operation, e.g., based on file extension, contents, or other factors. In the example shown, which is intended to be highly simplified, the tiering manager 130S has moved the data of files 140S to objects Obj #1, Obj #2, Obj #3, and Obj #4 in the cloud 150, such that Obj #1 stores the data of file "/Devel/Project1.xlsx," Obj #2 stores the data of "/Finance/statement.pdf," Obj #3 stores the data of "/Private/taxdocument.pdf," and Obj #4 stores the data of "/S3-dg.pdf." The data of file "/Personal/keep-local.pdf" is kept local, as the name implies, as this file has been designated for exclusion from cloud-tiering, even though the file resides within the writeable snapshot 126. The tiering manager 130S replaces the data of each of the files 140S with a respective stub 132, one stub 132 for each file.

Although the cloud-tiering operation replaces file data with stubs 132, the stubs 132 are created in the writeable snapshot 126 rather than in the source file system 122S. Thus, the source file system 122S continues to operate as before, with the same access to its files and with the same performance that it had prior to cloud-tiering.

After performing the cloud-tiering operation, the NAS system 110S proceeds to perform a namespace backup of writeable snapshot 126. In an example, the namespace backup includes all non-excluded directories in the writeable snapshot 126 and the stubs 132 of all non-excluded files. In an example, the namespace backup is performed as an NMDP (Network Data Management Protocol) backup with an option set for stubs only. As is known, NMDP is a standard protocol overseen by the Storage Networking Industry Association (SNIA). The NAS system 110S, e.g., acting through the tiering manager 130S, stores the namespace backup as an object (Obj #5) in the cloud 150. At this point, the writeable snapshot 126 is no longer needed and can be deleted.

In an example, once the objects #1-5 have been stored in the bucket 152 in the cloud 150, reflecting both the file content and the namespace of writeable snapshot 126, the target NAS system 110T receives a change notification 160. For example, the target NAS system 110T (and any number of other target systems) may subscribe to notifications from the cloud 150, where the target system receives a change notification 160 each time a creation or deletion of an object occurs in the bucket 152.

In response to the notification 160, the target NAS system 110T accesses the bucket 152 and performs a local restore (e.g., an NDMP restore) of the namespace backup from Obj #5, placing the restored namespace into the target file system 122T. Upon completion of the restore, file system 122T stores the complete namespace, minus any excluded content, of the writeable snapshot 126, which matches the namespace of the source file system 122S as of the time the base snapshot 124 was taken. Because the restored namespace includes directories and stubs 132 (for files 140T), clients of the target NAS system 110T can access the cloud-tiered files by navigating the namespace of file system 122T in the usual way. For example, a user might navigate file system 122T to directory "Private" and view a listing of the file names in the Private directory, which in this case include a single file, "taxdocument.pdf." By double-clicking on the file name, the user can cause the target NAS system 110T, e.g., acting through the tiering manager 130T, to access the corresponding object (Obj #4) in the cloud 150 through the corresponding stub. The target NAS system 110T downloads the file content from the cloud 150 and presents the content to the user. In some examples, the target NAS system 110T explodes the stub for the file, replacing the stub 132 in the target file system 122T with the respective file contents, which the NAS system 110T persists in local storage that backs the file system 122T, i.e., in accordance with the formatting requirements of the file system 122T.

Although the stubs 132 within target file system 122T may be exploded on demand, e.g., in response to user requests, stubs may alternatively be exploded as part of the restore. For example, after performing the NMDP restore operation, the target NAS system 110T may automatically explode all of the stubs 132, locally populating the data of all of the stubbed files and establishing an independent replica of the source file system 122S on the target.

As time passes, the source file system 122S in the source NAS system 110S continues to evolve, e.g., in response to user actions. For example, files may be created, deleted, or renamed, and hard links may be created.

Figure 2:
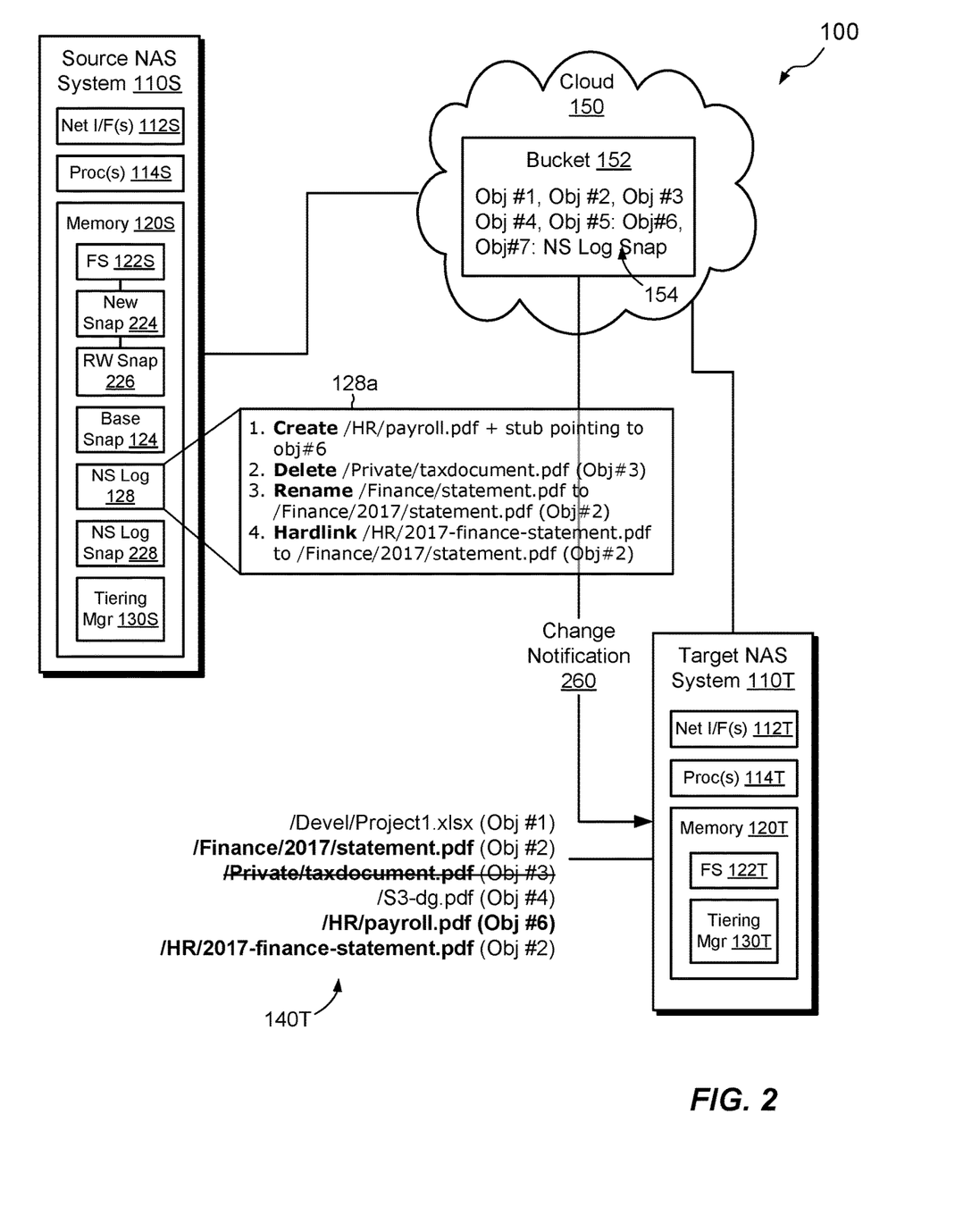
FIG. 2 is a block diagram showing an incremental update to a target file system.

FIG. 2 shows the arrangement of FIG. 1 at a later point in time. Here, the namespace log 128 has captured the changes to file system 122S as they occurred and has accumulated a time-ordered list 128a, which reflects all namespace changes in the file system 122S since the base snapshot 124 was taken. Although source file system 122S has evolved, target file system 122T has not changed, as it reflects the state of file system 122S an earlier time, i.e., at the time of base snapshot 124.

In accordance with further improvements, the source NAS system 110S performs acts to update the cloud 150 such that the cloud reflects changes in the source file system 122S. To this end, source NAS system 110S generates a new snapshot 224 of the source file system 122S, such that the new snapshot 224 captures the current state of file system 122S. At the same time, source NAS system 110S generates a snapshot of the namespace log 128, producing namespace log snapshot 228. In cases where the namespace log 128 is disposed within the file system 122S, snapshotting of the namespace log 128 occurs automatically as part of generating the new snapshot 224. The source NAS system 110S then clears the namespace log 128, returning it to its initial (empty) state, such that it can resume logging of namespace changes to file system 122S going forward. The source NAS system 110S also generates a new writeable snapshot 226, which is a snapshot of the new snapshot 224.

Having taken the new snapshot 224, the source NAS system 110S proceeds to identify differences between the new snapshot 224 and the base snapshot 124. For example, the source NAS system 110S scans the snapshots 124 and 224 and identifies any files that have been created or changed during the time between the snapshots 124 and 224. As will be described further below, the NAS system 110S may identify such files by checking for changes in inodes (index nodes) between the two snapshots and obtaining the pathnames of the new or changed files. The result of this snapshot comparison is a list of files and their pathnames.

For each of the listed files, which have been added or changed, the NAS system 110S invokes the tiering manager 130S to perform an incremental cloud-tiering operation on the writeable snapshot 226. To this end, the incremental cloud-tiering operation copies the data of each new file on the list from the writeable snapshot 226 to a respective new object 154 in the cloud 150. See, for example, Obj #6, which stores the data of newly added file "/HR/payroll.pdf." The operation replaces the data of each new file in writeable snapshot 226 with a respective stub 132 that points to the copied data in the cloud 150. For example, the stub 132 for the newly added file "/HR/payroll.pdf" points to Obj #6. For each changed file on the list, the incremental cloud-tiering operation copies the data of the changed file in the writeable snapshot 226 to the respective object 154 that already stores older data of that file. For example, assuming that the file "/Devel/Project1.xlsx" has changed, the tiering manager 130S refreshes Obj #1 in the cloud 150 to reflect the new contents. Although file deletions were not specifically discussed above, these may also be managed by deleting corresponding objects 154 in the cloud 150 (or by decrementing reference counts on those objects, deleting the objects only when the reference counts fall to zero). In some examples, the incremental cloud-tiering operation also copies data of the namespace-log snapshot 228 to a new object 154 in the cloud 150 (see Obj #7). In cases where the namespace log 128 resides as a file of the source file system 122S, the tiering manager 128 may copy the namespace log to the cloud 150 in the usual manner, replacing the file with a stub 132 in the writeable snapshot 226.

With the objects 154 of the listed files and the namespace log updated within the bucket 152, the target NAS system 110T (and any other subscribing targets) receives a change notification 160. In response, the target NAS system 110T obtains the contents of the namespace-log snapshot 228 from the cloud 150 and proceeds to replay the listed actions on the target file system 122T. For example, the target NAS system 110T reads the ordered list 128a of namespace actions and performs them one after another, in the order listed. Although the target file system 122T may use different technology for implementing the listed actions than did the source file system 122S, the results of performing the actions are analogous, such that the state of the target file system 122T after replaying the actions 128a is substantially identical to the state of the source file system 122S when the new snapshot 224 was taken. Clients may access the changed contents by navigating the namespace of file system 122T, and any new content is downloaded from respective objects 154 in the cloud upon access. Alternatively, downloading of new or changed content can be performed automatically as part of the update.

Figure 3:
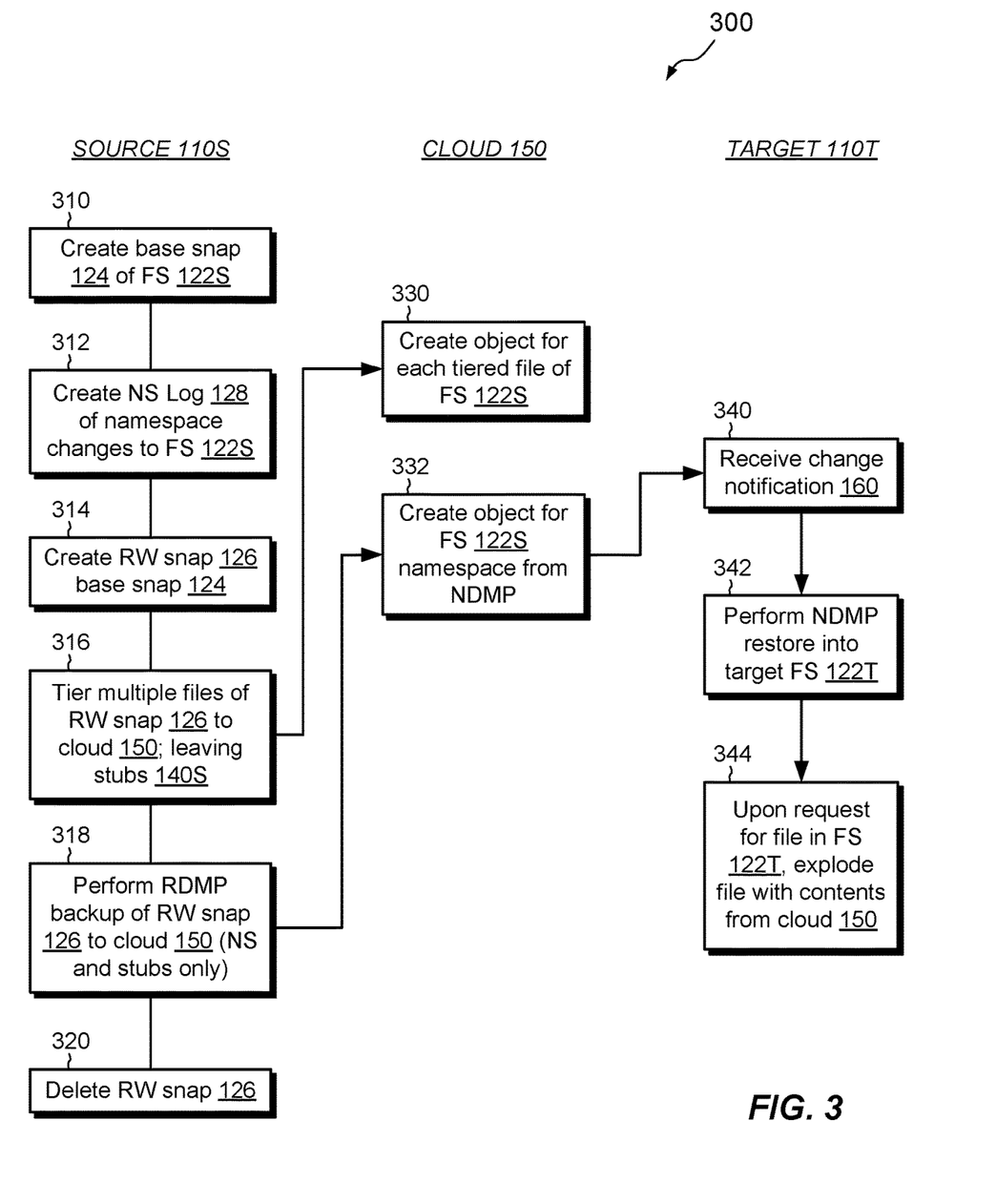
FIG. 3 is a flowchart showing an example method for performing a baseline replication of a file system from the source to the target.

FIG. 3 shows an example method 300 for performing a baseline replication of source file system 122S on the source NAS system 110S to the target file system 122T on the target NAS system 110T. Acts performed by the source NAS system 110S, cloud 150, and target NAS system 110T are shown in respective columns. One should appreciate that actions shown for the target NAS system 110T may be performed by any number of target systems. Also, the order of the acts shown may be varied in any suitable way, and some acts may be performed simultaneously.

At 310, the source NAS system 110S creates a base snapshot 124 of source file system 122S. In an example, the base snapshot 124 is a read-only snapshot. At 312, the source NAS system 110S creates or otherwise initializes the namespace log 128, which is initially empty. The source NAS system 110S may create the namespace log 128 within the source file system 122S, e.g., as a file, and in this case creation or initialization of the namespace log 128 would happen immediately after taking the base snapshot 124, so that the namespace log 128 is able to preserve all file-system transactions that occur after the base snapshot 124 is taken.

At 314, the source NAS system 110S generates a writeable snapshot 126, which is taken from the base snapshot 124. The writeable snapshot 126 is thus a snapshot of a snapshot.

At 316, the source NAS system 110S performs a cloud-tiering operation to copy data of the set of files 140S to respective objects 154 in the cloud 150, e.g., in the bucket 152. In so doing, the source NAS system 110S also replaces data of cloud-tiered files with stubs 132 that point to the respective objects 154 in the cloud 150.

At 318, the source NAS system 110S performs a namespace backup of the writeable snapshot 126 to an object 154 in the cloud 150. The namespace backup includes directories and stubs 132 of all cloud-tiered files but normally excludes file data. For achieving the backup, the source NAS system 110S may employ RDMP with the stubs-only option.

At 320, the source NAS system 110S may delete the writeable snapshot 126, as it is no longer needed. Deletion of the snapshot 126 should be regarded as optional, however, as it may be desirable to keep the snapshot for forensic or historical purposes.

Over in the cloud 150, the data of each cloud-tiered file is received at 330 and stored in a respective object 154, e.g., one object per file. At 332, the cloud 150 receives the namespace backup, e.g., the RDMP backup, and stores the backup in an object 154. In response to new objects 154 being created in the bucket 152, the cloud 150 sends a change notification 160 to the target NAS system 110T (and to any other subscribing targets).

The target NAS system 110T receives the change notification 160 at 340. At 342, the target NAS system 110T performs a restore (e.g., an NDMP restore) from the namespace backup into the target file system 122T. The namespace restore establishes the namespace of the source file system 122S (as of the snapshot 124) at the target, laying out its directory structure and providing stubs 132 that point to objects 154 storing data of the files 140S.

At 344, the target NAS system 110T responds to a request to access a file of file system 122T by accessing the stub 132 for the requested file and fetching the file data from the specified object 154 in the cloud 150. The data of the file is downloaded to the target NAS system 110T, where it may replace the stub for the file in the target file system 122T and get placed in local persistent storage that backs the target file system 122T.

Figure 4:
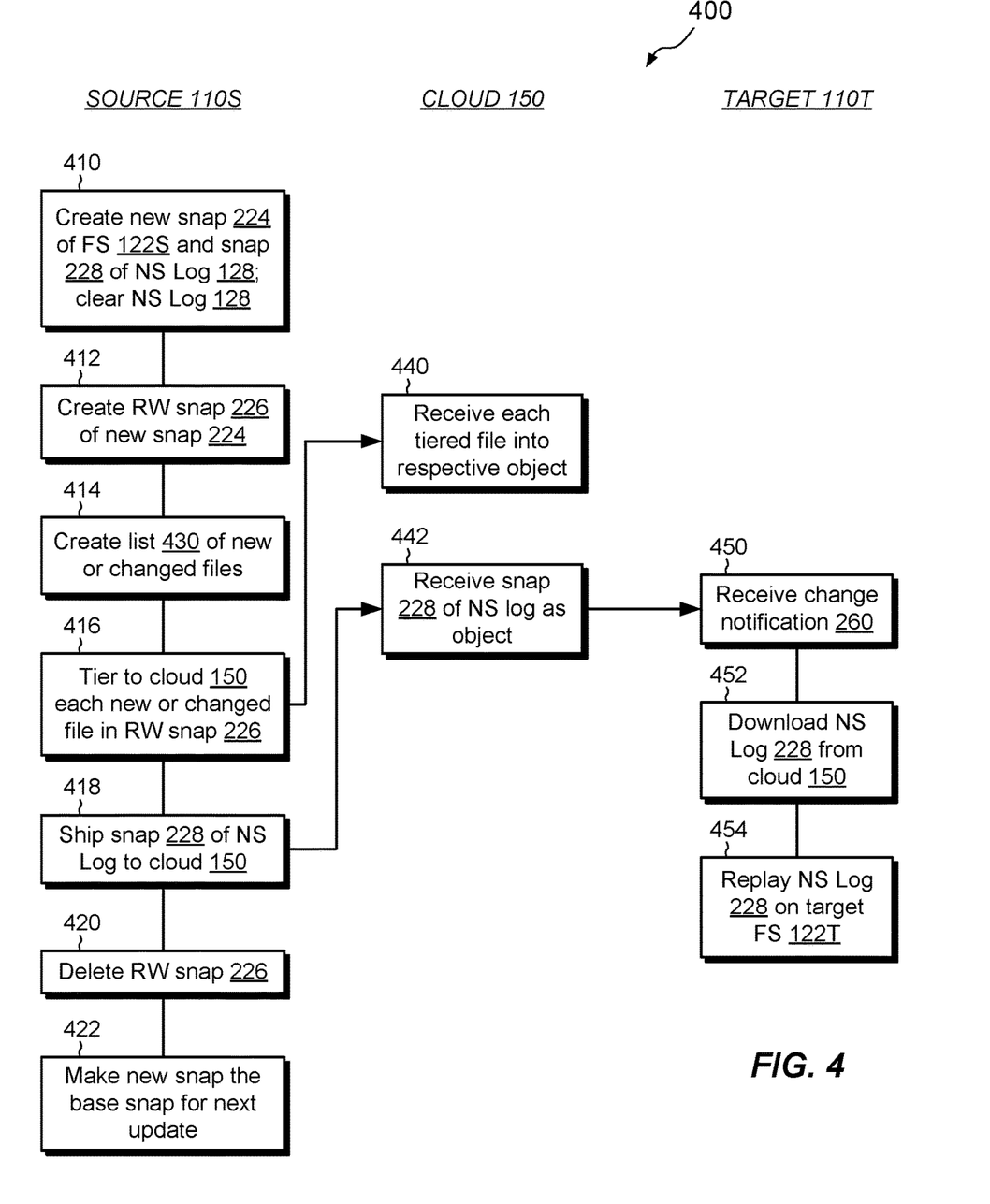
FIG. 4 is a flowchart showing an example method for performing an incremental update of the target file system after changes are made to the source file system.

FIG. 4 shows an example method 400 for performing an incremental replication of source file system 122S to the target file system 122T. As before, acts performed by the source NAS system 110S, cloud 150, and target NAS system 110T are shown in respective columns, and actions shown for the target NAS system 110T may be performed by any number of target systems. The order of the acts shown may be varied, and some acts may be performed simultaneously.

At 410, the source NAS system 110S generates a new snapshot 224 of source file system 122S. If the namespace log 128 is stored separately from the file system 122S, an additional snapshot 228 may be taken of the namespace log 128.

At 412, the source NAS system 110S generates a writeable snapshot 226, which is a snapshot of the new snapshot 224.

At 414, the source NAS system 110S creates a list 430 of new or changed files, i.e., all non-excluded files that have been newly added or modified between the time of base snapshot 124 and the time of new snapshot 224.

At 416, the source NAS system 110S performs an incremental cloud-tiering operation for each of the files on the list 430, e.g., by creating new objects 154 for newly-created files and by updating existing objects 154 for modified files. For newly-created files on the list 430, the source NAS system 110S also replaces the data of such files in the writeable snapshot 226 with stubs 132 that point to the respective new objects 154.

At 418, the source NAS system 110S ships the snapshot 228 of the namespace log 128 to the cloud 150. This act may be implicit in act 416 if the source file system 122S stores the namespace log as a file.

At 420, the source NAS system 110S optionally deletes the writeable snapshot 226, as it has served its purpose. At 422, the source NAS system 110S treats the new snapshot 224 as a base snapshot for the next update. For example, the source NAS system 110S stores the new snapshot 224 in place of the original base snapshot 124. The original base snapshot 124 is no longer needed.

In the cloud 150 at 440, each tiered file is received into a respective object 154. For example, the cloud 150 creates a new object 154 in the bucket 152 for each new file on the list 430 and refreshes the data of any object 154 for which the respective file data has changed.

At 442, the cloud 150 receives the snapshot 228 of the namespace log 128 into an object 154, which may be a new object if this is the first update. However, act 442 may be implicit if the namespace log 128 is realized as a file in file system 122S, as the cloud 150 would receive the namespace log at 440 in the same manner that it receives other file data.

At 450, the target NAS system 110T (and at any other target) receives a change notification 260, indicating that a change has occurred in the bucket 152. In response, at 452, the target NAS system 110T downloads the namespace log from the corresponding object 154 in the cloud 150. At 454, the target NAS system 110T replays the acts on the list 128a (FIG. 2) against the target file system 122T, establishing the same namespace changes in the target file system 122T as were made in the source file system 122S since the previous base snapshot 124 was taken.

The method 400 of FIG. 4 may be repeated at regular intervals or at any desired intervals and may continue indefinitely. It may also be initiated explicitly by and administrator. Each time the method 400 is run, the source NAS system 110S takes a new snapshot of the source file system 122S, takes a writeable snapshot of the new snapshot, clears the current namespace log, identifies new or changed files since the previous snapshot, and ships the new content to the cloud 150. The cloud 150 notifies all subscribed target systems, which can download the namespace log and replay the actions prescribed to bring the respective target file systems into a consistent state with the source file system.

Figure 5A:
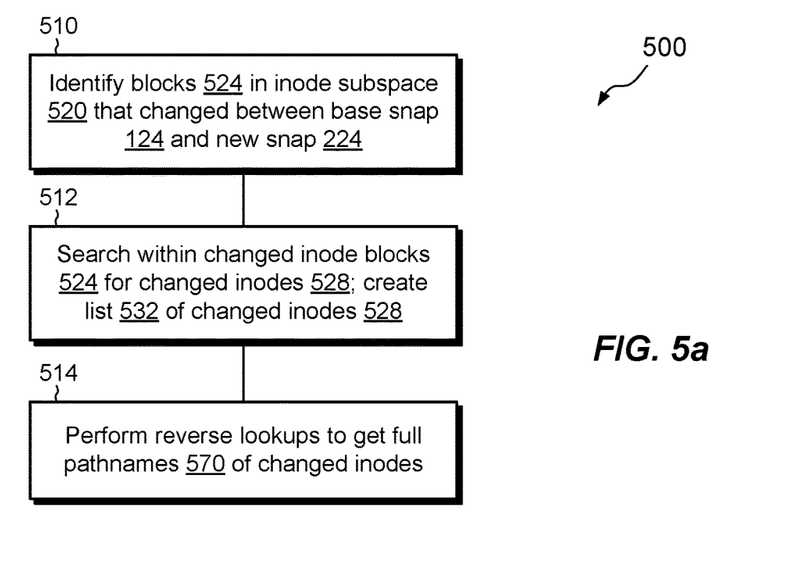
FIGS. 5a-5c are a flowchart and associated block diagrams showing an example arrangement for identifying files in the source file system that have been created or changed since a previous update.
Figure 5B:
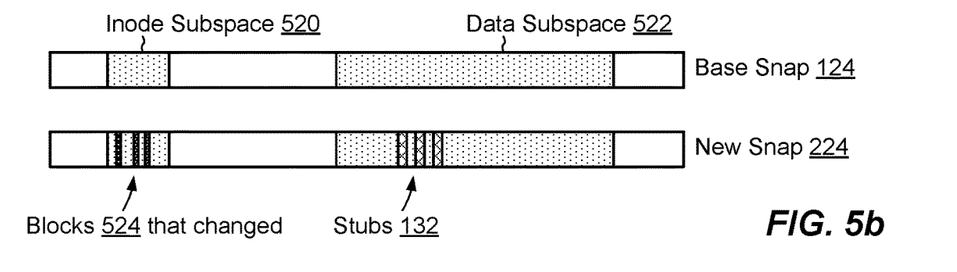
Figure 5C:
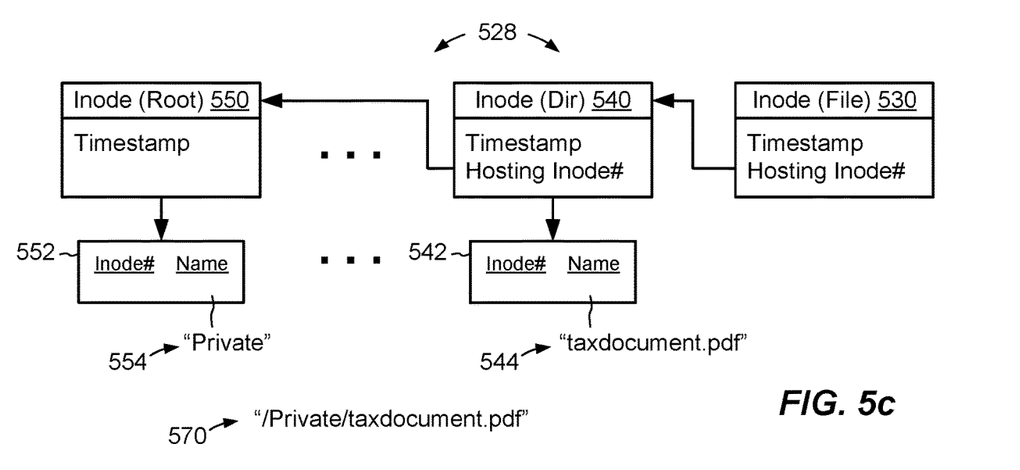

FIGS. 5*a*-5*c* show an example method 500 for creating the list 430 of new or changed files, thus providing additional supporting detail for act 414 of FIG. 4.

At 510, the source NAS server 110S identifies inode blocks 524 that have changed between the base snapshot 124 and the new snapshot 224. As is known, "modes" are data structures that file systems allocate on a per-file basis, such that each file in a file system has a respective inode. Each inode stores information about a respective file, such as its size, ownership, and permissions. Some inodes also store a timestamp, which indicates the last time the corresponding file was updated, as well as a pointer to a hosting inode, such as the inode of a directory that includes the corresponding file. Directories also have inodes and may be regarded as files.

As shown in FIG. 5*b*, each of the snapshots 124 and 224 includes an inode subspace 520 and a data subspace 522, which reflect subspaces found in the source file system 122S. To identify new files and files that have changed, the source NAS server 110S starts by identifying inode blocks 524 that have changed. To this end, the source NAS server 110S scans the inode subspace 520 of the new snapshot 224 and searches for any blocks that differ from blocks at corresponding locations in the base snapshot 124. As is known, a "block" is the smallest unit of storage that a file system can allocate. Typical block sizes are 4 kB or 8 kB, for example.

At 512, having identified all the inode blocks 524 in the new snapshot 224 that are different from corresponding blocks in the base snapshot 124, the source NAS server 110S searches within each of the inode blocks 524 for individual inodes that have changed. For example, each inode block may contain multiple inodes 528, and the source NAS server 110S checks the timestamp of each inode 528 in the inode blocks 524. If an inode's timestamp is newer than the time of the base snapshot 124, then the inode corresponds to a new or modified file. The result of act 512 is a list 532 of changed inodes 528.

At 514, having generated the list 532 of changed inodes 528, the source NAS system 110S performs a reverse lookup on each listed inode 528 to obtain a list of pathnames 570 that correspond to the listed inodes 528. For example, if inode 530 (FIG. 5*c*) is one of the changed inodes 528, then the source NAS system 110S builds the pathname 570 incrementally by following the pointer in inode 530 to the hosting inode, which in this case is inode 540, which has been allocated for a directory 542. The source NAS system 110S the accesses the directory 542, which includes a list of inode numbers of contents of the directory 542 and associated names. The source NAS system 110S locates the inode number of inode 530, obtains the associated name 544 ("taxdocument.pdf"), and uses this name 544 in constructing the pathname 570. The source NAS system 110S then continues back, following the pointer in inode 540 to its hosting inode 550, which in this case happens to be root. The source NAS system 110S reads the associated directory 552, finds the inode number of inode 540, and obtains the corresponding name 554 ("Private"). As the source NAS system 110S is already at root, it can now reconstruct the entire pathname 570 by concatenating the names 554 and 544 and inserting proper delimiters, arriving at the overall result "/Private/taxdocument.pdf." This reverse-lookup operation is repeated for each inode 528 on the list 532. The overall result is the list 430 of new or changed files, which is the list of pathnames 570 constructed for all inodes 528 on the list 532.

Figure 6:
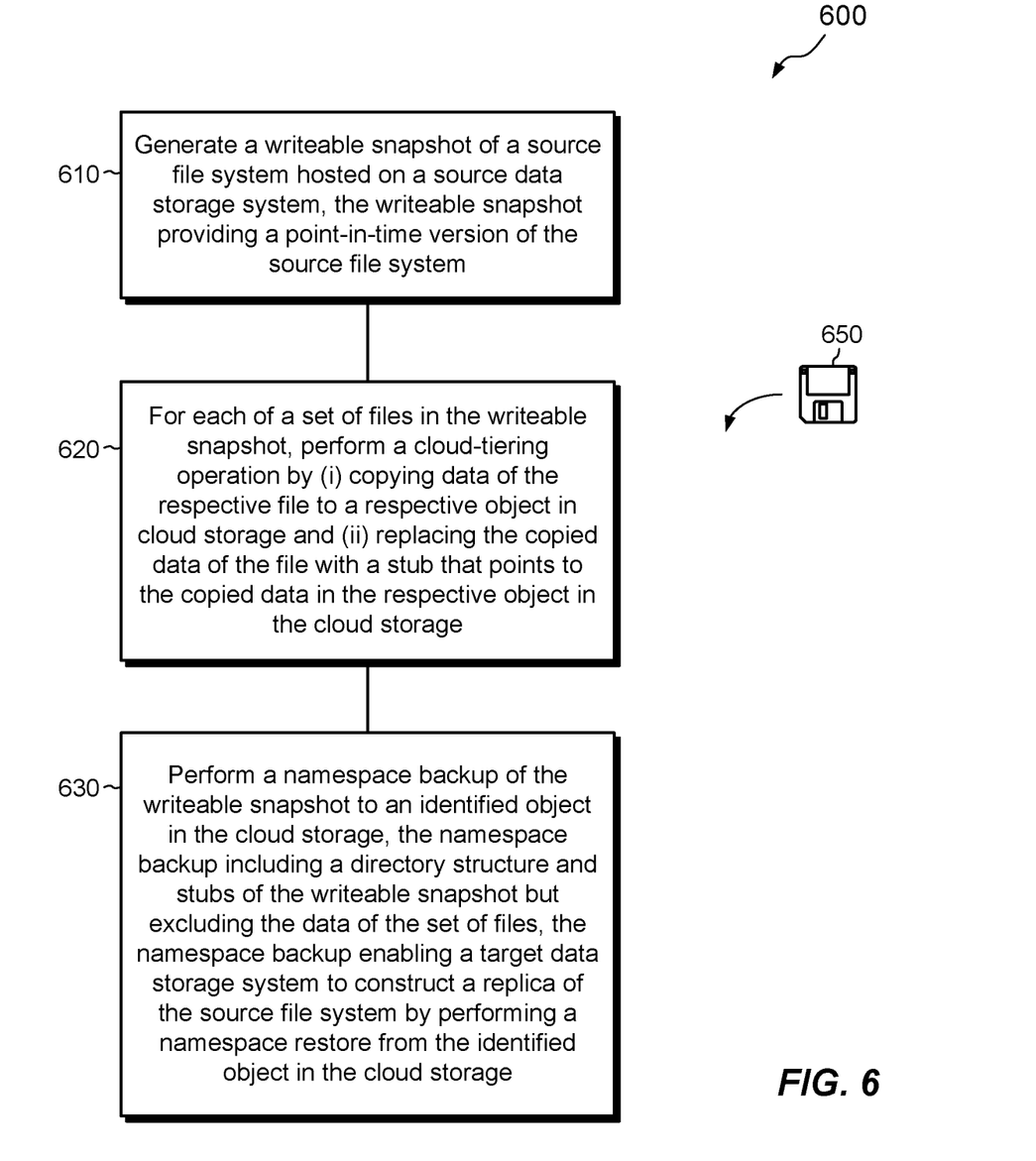
FIG. 6 is a flowchart showing an example method of replicating file systems using cloud storage.

FIG. 6 shows an example method 600 that may be carried out in connection with the environment 100. The method 600 is typically performed, for example, by the software constructs described in connection with FIG. 1, which reside in the memory 120S of the source NAS system 110S and are run by the set of processors 114S. The various acts of method 600 may be ordered in any suitable way. Accordingly, embodiments may be constructed in which acts are performed in orders different from that illustrated, which may include performing some acts simultaneously.

At 610, a writeable snapshot 126 is generated of a source file system 122S hosted on a source data storage system 1105. The writeable snapshot may be generated as a snapshot of a read-only base snapshot 124. The writeable snapshot 126 provides a point-in-time version of the source file system 122S.

At 620, for each of a set of files 140S in the writeable snapshot 126, a cloud-tiering operation is performed by (i) copying data of the respective file to a respective object 154 in cloud storage 150 and (ii) replacing the copied data of the file with a stub 132 that points to the copied data in the respective object 154 in the cloud storage 150.

At 630, a namespace backup is performed of the writeable snapshot 126 to an identified object (e.g., Obj #5) in the cloud storage 150. The namespace backup includes a directory structure and stubs 132 of the writeable snapshot 126 but excludes the data of the set of files 140S. The namespace backup thus enables a target data storage system 110T to construct a replica 122T of the source file system 122S by performing a namespace restore from the identified object (e.g., Obj #5) in the cloud storage 150.

An improved technique has been described for replicating file systems to any number of target systems. The technique includes obtaining a writeable snapshot 126 of a file system 122S on a source 1105, performing cloud tiering of files 140S in the snapshot 126, replacing the file contents of the snapshot with stubs 132 pointing to the cloud 150, and generating a namespace backup of the snapshot 126 that includes directories and stubs 132. The source 1105 system ships the namespace backup to the cloud 150, allowing any authorized target system, such as system 110T, to restore from the namespace backup to a local file-system replica 122T, such that contents of the cloud-tiered files are made accessible on the target system 110T from the restored namespace via the stubs 132.

Having described certain embodiments, numerous alternative embodiments or variations can be made. For example, although the replication as shown and described is one-way, from the source NAS system 1105 to the target NAS system 110T, the direction of replication may be reversed. For example, if the source NAS system 110S experiences a failure, user access may failover to the target NAS system 110T, which becomes the new source. Later, when NAS system 110S is restored, the NAS system 110T can replicate the changes since the failure back to NAS system 110S, via the cloud 150. Roles may switch again, once NAS system 110S is fully updated, with NAS system 110S resuming its activities as source.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of replicating file systems using cloud storage, the method comprising:

generating a writeable snapshot of a source file system hosted on a source data storage system, the writeable snapshot providing a point-in-time version of the source file system;

for each of a set of files in the writeable snapshot, performing a cloud-tiering operation by (i) copying data of the respective file to a respective object in cloud storage and (ii) replacing the copied data of the file with a stub that points to the copied data in the respective object in the cloud storage; and performing a namespace backup of the writeable snapshot to an identified object in the cloud storage, the namespace backup including a directory structure and stubs of the writeable snapshot but excluding the data of the set of files, the namespace backup enabling a target data storage system to construct a replica of the source file system by performing a namespace restore from the identified object in the cloud storage.

2. The method of claim 1, wherein performing the cloud-tiering operation causes no file data in the source file system to be replaced by any stubs.

3. The method of claim 2, further comprising, prior to generating the writeable snapshot of the source file system, generating a base snapshot of the source file system, wherein the writeable snapshot of the source file system is generated as a snapshot of the base snapshot.

4. The method of claim 3, further comprising, after the source file system has accumulated a set of changes since the base snapshot was generated:

generating a new snapshot of the source file system;
generating a new writeable snapshot of the new snapshot;
identifying a list of files that were created or changed between generating the base snapshot and generating the new snapshot; and
performing an incremental cloud-tiering operation on each of the list of files, the incremental cloud-tiering operation writing updated file content to objects in the cloud storage to reflect file creations and/or changes as indicated in the list of files.

5. The method of claim 4, wherein performing the incremental cloud-tiering operation includes, for each new file on the list of files that was created since the base snapshot was generated, (i) copying data of the new file to a respective new object in the cloud storage and (ii) replacing the data of the new file with a stub that points to the respective new object in the cloud storage.

6. The method of claim 5, wherein performing the incremental cloud-tiering operation further includes, for each changed file on the list of files that was changed but not created since the base snapshot was generated, copying data of the changed file to the object to which the stub of the changed file points.

7. The method of claim 4, wherein identifying the list of files that were created or changed between generating the base snapshot and generating the new snapshot includes:
  comparing the new snapshot with the base snapshot to identify a list of inodes that differ between the new snapshot and the base snapshot;
  for each of the list of inodes, performing a reverse lookup of the respective inode to construct a respective pathname for the respective inode; and
  providing the pathname constructed for each of the list of inodes as an entry in the list of files that were created or changed, the incremental cloud-tiering operation thereby performed based on changes in the inodes.

8. The method of claim 7, wherein identifying the list of inodes includes:
  identifying a list of inode blocks that differ between the new snapshot and the base snapshot; and
  identifying inodes within the list of inode blocks that differ between the new snapshot and the base snapshot.

9. The method of claim 4, further comprising:
  writing namespace changes to a namespace log, the namespace log initialized when the base snapshot is generated and accumulating descriptions of namespace transactions made to the source file system between generating the base snapshot and generating the new snapshot; and
  copying the namespace log to an object in the cloud storage.

10. The method of claim 9, further comprising subscribing the target data storage system to the cloud storage, such that the target data storage system receives notifications of creations and deletions of objects in the cloud storage that store data or metadata of the source file system.

11. The method of claim 9, wherein copying the data of the set of files, the namespace backup, and the namespace log to the cloud storage includes directing the cloud storage to store the data of the set of files, the namespace backup, and the namespace log in a single bucket of an object store, such that the target data storage system receives notifications of creations and deletions of any objects in the bucket.

12. The method of claim 10, further comprising, upon the target data storage system receiving a notification from the cloud storage, downloading the namespace log to the target data storage system and replaying the namespace transactions against the replica of the source file system, the replica thereby becoming current with the source file system up to the new snapshot.

13. The method of claim 4, wherein the set of files of the writeable snapshot exclude at least one file specified to be kept local.

14. The method of claim 2, further comprising, for each of multiple target data storage systems, constructing a respective replica of the source file system on the respective target data storage system by performing a namespace restore from the identified object in the cloud storage.

15. A data storage system, comprising control circuitry that includes a set of processors coupled to memory, the control circuitry constructed and arranged to:
  generate a writeable snapshot of a source file system hosted on a source data storage system, the writeable snapshot providing a point-in-time version of the source file system;
  for each of a set of files in the writeable snapshot, perform a cloud-tiering operation by (i) copying data of the respective file to a respective object in cloud storage and (ii) replacing the copied data of the file with a stub that points to the copied data in the respective object in the cloud storage; and
  perform a namespace backup of the writeable snapshot to an identified object in the cloud storage, the namespace backup including a directory structure and stubs of the writeable snapshot but excluding the data of the set of files, the namespace backup enabling a target data storage system to construct a replica of the source file system by performing a namespace restore from the identified object in the cloud storage.

16. A computer program product including a set of non-transitory, computer-readable media having instructions which, when executed by control circuitry of one or more data storage systems, cause the control circuitry to perform a method of replicating file systems using cloud storage, the method comprising:
  generating a writeable snapshot of a source file system hosted on a source data storage system, the writeable snapshot providing a point-in-time version of the source file system;
  for each of a set of files in the writeable snapshot, performing a cloud-tiering operation by (i) copying data of the respective file to a respective object in cloud storage and (ii) replacing the copied data of the file with a stub that points to the copied data in the respective object in the cloud storage; and
  performing a namespace backup of the writeable snapshot to an identified object in the cloud storage, the namespace backup including a directory structure and stubs of the writeable snapshot but excluding the data of the set of files, the namespace backup enabling a target data storage system to construct a replica of the source file system by performing a namespace restore from the identified object in the cloud storage.

17. The computer program product of claim 15, wherein performing the cloud-tiering operation causes no file data in the source file system to be replaced by any stubs, and wherein the method further comprises, prior to generating the writeable snapshot of the source file system, generating a base snapshot of the source file system, wherein the writeable snapshot of the source file system is generated as a snapshot of the base snapshot.

18. The computer program product of claim 17, wherein the method further comprises, after the source file system has accumulated a set of changes since the base snapshot was generated:
  generating a new snapshot of the source file system;
  generating a new writeable snapshot of the new snapshot;
  identifying a list of files that were created or changed between generating the base snapshot and generating the new snapshot; and performing an incremental cloud-tiering operation on each of the list of files, the incremental cloud-tiering operation writing updated file content to objects in the cloud storage to reflect file creations and/or changes as indicated in the list of files.

19. The computer program product of claim 18, wherein the method further comprises:

writing namespace changes to a namespace log, the namespace log initialized when the base snapshot is generated and accumulating descriptions of namespace transactions made to the source file system between generating the base snapshot and generating the new snapshot; and copying the namespace log to an object in the cloud storage.

20. The computer program product of claim 19, wherein the method further comprises the target data storage system:

receiving a change notification from the cloud storage;

downloading the namespace log; and replaying the namespace transactions against the replica of the source file system, the replica thereby becoming current with the source file system up to the new snapshot.

\* \* \* \* \*